(12) United States Patent
Kramer et al.

(10) Patent No.: US 10,162,560 B2
(45) Date of Patent: Dec. 25, 2018

(54) MEMORY UNIT FOR AUTOMATICALLY MULTIPLYING THE CONTENT OF A MEMORY LOCATION, AND DATA NETWORK HAVING A MEMORY UNIT

(71) Applicant: Robert Bosch GmbH, Stuttgart (DE)

(72) Inventors: Simon Kramer, Leonberg (DE); Bjoern Saballus, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 11 days.

(21) Appl. No.: 15/156,941

(22) Filed: May 17, 2016

(65) Prior Publication Data

US 2016/0371010 A1 Dec. 22, 2016

(30) Foreign Application Priority Data

Jun. 19, 2015 (DE) .................. 10 2015 211 320

(51) Int. Cl.
    *G06F 3/06* (2006.01)
    *G06F 9/54* (2006.01)
    *G06F 12/00* (2006.01)

(52) U.S. Cl.
    CPC ............ *G06F 3/065* (2013.01); *G06F 3/0614* (2013.01); *G06F 3/0683* (2013.01); *G06F 9/542* (2013.01); *G06F 9/544* (2013.01); *G06F 12/00* (2013.01)

(58) Field of Classification Search
    CPC ...... G06F 3/0614; G06F 3/065; G06F 3/0683; G06F 9/542; G06F 9/544; G06F 12/00
    See application file for complete search history.

(56) References Cited

U.S. PATENT DOCUMENTS

| | | | | |
|---|---|---|---|---|
| 6,127,947 A | * | 10/2000 | Uchida | B60G 17/0195 340/439 |
| 2003/0167419 A1 | * | 9/2003 | Yanai | G06F 3/0601 714/6.31 |
| 2005/0120092 A1 | * | 6/2005 | Nakano | G06F 11/2058 709/217 |
| 2007/0234108 A1 | * | 10/2007 | Cox | G06F 11/2058 714/6.12 |
| 2013/0024722 A1 | * | 1/2013 | Kotagiri | G06F 11/1004 714/6.1 |
| 2014/0006908 A1 | * | 1/2014 | Gruber | H04L 1/0061 714/776 |
| 2015/0358058 A1 | * | 12/2015 | Chai | H04B 7/0413 370/329 |

* cited by examiner

*Primary Examiner* — Aracelis Ruiz

(74) *Attorney, Agent, or Firm* — Norton Rose Fulbright US LLP; Gerard Messina

(57) ABSTRACT

A memory unit, which has a plurality of memory locations for accommodating data and which is designed to copy the content of a first memory location of the memory unit, when this first memory location is written, automatically into a first memory location at least of one other memory unit, the first memory location of the at least one other memory unit being readable and writable independently of the first memory location of the memory unit; and to a data network having at least two such memory units, a transmitter and at least one receiver, the transmitter being designed to write a datum to be sent into the first memory location of a first of the at least two memory units, and the at least one receiver being designed to read and to process the datum from the first memory location of a second memory unit of the at least two memory units.

16 Claims, 1 Drawing Sheet

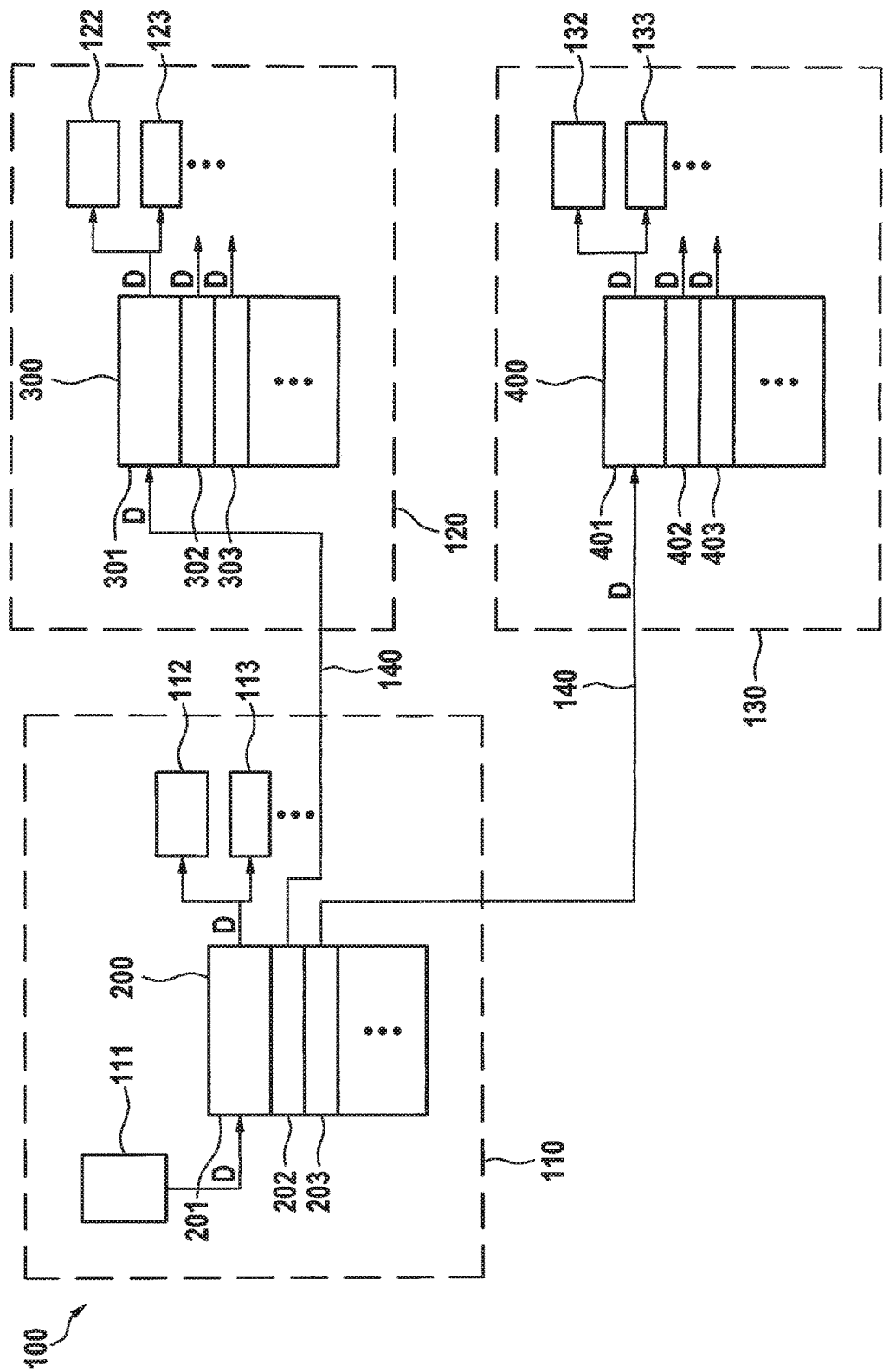

MEMORY UNIT FOR AUTOMATICALLY MULTIPLYING THE CONTENT OF A MEMORY LOCATION, AND DATA NETWORK HAVING A MEMORY UNIT

CROSS REFERENCE

The present application claims the benefit under 35 U.S.C. § 119 of German Patent Application No. DE 102015211320.5 filed on Jun. 19, 2015, which is expressly incorporated herein by reference in its entirety.

FIELD

The present invention relates to a memory unit and a data network having at least two such memory units, a transmitter and at least one receiver.

BACKGROUND INFORMATION

A processing unit such as a microcontroller or generally an integrated circuit (IC) may include a so-called multicore processor. For this purpose, a plurality of processor cores may be integrated on a single chip (die). A processor core usually includes an arithmetic-logic unit (ALU), which represents the actual electronic computer for executing tasks, programs, arithmetic instructions, etc., and additionally a local memory, which usually only the respective processor core is able to access. The processing unit may also include a global memory, which all processor cores are able to access.

In single-core or multicore processors for embedded systems, it is always possible to trace back the communication between two software execution processes to the reading and writing of a known memory location. This applies both to communication via global variables, where the memory address, at which the variable is stored, must be known, as well as to communication via communication channels, which at the lowest level is again based on the reading and writing of known memory locations via the direct (or indirect) addressing of these locations. In the latter case, the exchange of messages via communication channels, a software layer assumes the task of distributing the messages. For this purpose, this software layer stores, e.g., using memory tables, which message is to be written to which memory address or be transmitted to which other processor in the assemblage. For example, a software process stores a message in a local buffer and hands over this buffer to a function in the operating system or directly to the hardware driver, which is responsible for, e.g., the network card, including all required information such as for example the destination address, which may be a memory address or a network address. The operating system or the hardware driver takes this buffer and writes it either into the destination memory address or into the hardware buffer, which then transmits the data into the network. In the case of numerous receivers, this is relatively laborious.

SUMMARY

The present invention provides for a memory unit as well as for a data network having at least two such memory units, a transmitter and at least one receiver. Advantageous developments are described below.

When using the example memory unit of the present invention, it is not necessary for the transmitter to know the memory or network address(es) of the at least one receiver or of other receiving memory units. In particular, the datum to be transmitted therefore does not need to contain an address of the at least one receiver and/or an address of other receiving memory units. The message distribution occurs automatically via the memory unit as a hardware device, and does so not only to one receiver, but advantageously to a plurality of receivers, it not being necessary for the transmitter to be informed about their existence. The transmitter only needs to write the message to a memory location (memory location of the memory unit) known to the transmitter. Subsequently, the memory unit assumes the task of automatically transmitting the message to a configurable number of additional memory units. The memory unit is preferably developed as part of an integrated circuit.

The memory unit is able to distribute data both within one and the same processing unit (e.g., many-core or multicore processor) as well as between different processing units (e.g., network).

If the transmitter and the receiver are part, e.g., processor cores, of one and the same processing unit, then a software layer could thereby be freed and the operating system of the processing unit could be relieved, which saves computing time.

In the example approach of the present invention, the datum is not transmitted to a plurality of receivers in the conventional sense, but particularly only to one memory unit, which then performs the further distribution self-sufficiently. This is also not a cache approach, however, since in contrast to caches, this approach deals with real independent copies of the source, which may be modified and processed at will.

In other words, the present invention provides for an active first memory unit, which, when a first memory location is written, automatically transmits or copies the data to a number of specified first memory locations of other second memory units. In particular, one or more of the receiving second memory units may be part of the same processing unit as the first or another processing unit. In the first case, the transmitter and the receiver are in particular different cores of the same processing unit or software processes that run on different cores of the same processing unit, and in the second case on different processing units.

The second memory unit is advantageously designed to register with the first memory unit for receiving the data. Alternatively or additionally, the at least once receiver is advantageously designed to register with the first memory unit for receiving the data. This makes it possible, e.g., for interested receivers or their associated memory units to register, in a way similar to a "publish-subscribe" mechanism, with a memory unit that is responsible for a specific datum, in order to receive the data as well. For this purpose, it is not necessary that this be the same (master) memory unit that has the first (original) memory location, but rather the registration may occur in any additional (slave) memory unit that participates in the transmission of the datum. The communication in, e.g., a network or on a bus is thereby reduced and the transmitter is relieved because it is not necessary for the transmitter to process all registration requests.

In order to receive data from a given service or software process, a software layer is traditionally able to provide a "publish-subscribe" mechanism. For this purpose, the service provides data (publish) and the clients that are interested in this datum register (subscribe) either directly with this service or with the software layer in order to receive these data when they are provided.

Alternatively, however, it is also possible to provide a static configuration, in which the addresses of the respective destination memory units are permanently stored in the respective output memory unit and/or the respective receivers are permanently connected to the respective memory unit. This makes dynamic registrations superfluous and is very advantageous especially in motor vehicles, in which the participating processing units are normally known at the end of the production line and do not change anymore. Another advantage is that there is now no longer a need for a software layer that is responsible for message transmission or the registration of additional interested parties. By specifying multiple addresses, the present invention makes it possible to implement multicast in hardware. By cascading multiple memory units, messages may be exchanged more quickly and more efficiently between the transmitter and multiple receivers since the processor of the transmitter is relieved when transmitting the data.

Furthermore, by an appropriate routing via multiple memory units, it is possible to implement an fault-tolerant message delivery since in this case there is no longer only one route from the transmitter to the receiver, but rather a configurable number of alternative routes in the event that an intermediate station fails.

The present invention may yield particular advantages in motor vehicles since there it is often necessary for a plurality of control units equipped with processing units to communicate. Control units in motor vehicles assume a plurality of different functionalities. Engine control units, for example, are able to assume control of combustion engines and/or electric motors or brake control units may assume control of the brakes. Driver assistance control units may execute various driver assistance functions such as radar, camera, parking assistance, antiblock system (ABS), acceleration slip regulation (ASR), electronic stability control (ESC), adaptive cruise control (ACC), etc. Furthermore, control units may be provided for chassis system, which may assume for example the control of the airbag.

Additional advantages and developments of the present invention derive from the description and the FIGURE.

The present invention is schematically shown in the FIGURE on the basis of an exemplary embodiment and is described below with reference to the FIGURE.

BRIEF DESCRIPTION OF THE DRAWING

FIG. 1 shows a preferred specific embodiment of a data network of the present invention having two memory units, a transmitter and multiple receivers.

DETAILED DESCRIPTION OF EXAMPLE EMBODIMENTS

FIG. 1 schematically shows a preferred specific embodiment of a data network of the present invention that is indicated by reference numeral 100. Data network 100 has a first processing unit 110, for example a many-core system of a motor vehicle control unit, a second processing unit 120, for example a many-core system of another motor vehicle control unit, and a third processing unit 130, for example likewise a many-core system of still another motor vehicle control unit. Elements 110 and/or 120 and/or 130 may also be part of the same processing unit, e.g. cores in a single many-core system, or also of the same memory. There too, the present invention may be used advantageously to reduce cross-core communication since it is possible to write only once cross-core, but to read multiple times locally.

In particular, software processes run on each processing unit that are able to function as transmitters and/or as receivers. Exemplary software processes are indicated by 111, 112, 113, which are executed on the many-core system. In this instance, software process 111 functions as a transmitter of data D and software processes 112, 113 function as receivers of data D. An exemplary transmitter is a process that reads out the rotational speed and provides it to other processes. This value is, e.g., read by all processes that must make rotational-speed-dependent decisions, e.g., the calculation of the injection quantity or of the injection times.

A preferred specific embodiment of a memory unit according to the present invention is indicated by 200 and is part of processing unit 110. Memory unit 200 has one first memory location 201 and two second memory locations 202 and 203. First memory location 201 is used to accommodate data, while the second memory locations 202 and 203 contain addresses of other or second memory units 300, 400 according to the present invention, to which or into which the data from first memory location 201 are to be copied. Memory unit 200 is designed to copy the content (here the data D) of first memory location 201 automatically into the first memory locations 301, 401, defined by way of the addresses in the two second memory locations 202 and 203, of the other or second memory units 300, 400, whenever or as soon as first memory location 201 is written. First memory locations 301 and 401 are able to be written and read independently of first memory location 201. In particular, a change of the content of memory location 301 or 401 has no effect on the content of memory location 201.

Receivers 112 and 113 are designed to read and process the data D from the first memory location 201. The reading corresponds to the usual reading of data in a memory address. Although only two receivers are shown in control unit 110 in the FIGURE, there may be arbitrarily many and also—as a function of the transmitter and the data to be transmitted—variable transmitters and receivers.

FIG. 1 furthermore shows that memory unit 200 transmits data D also to second memory unit 300 in second control unit 120 via a network connection 140 and copies data D there into first memory location 301. Memory unit 300 is likewise designed to copy the content of first memory location 301 automatically into first memory locations, defined by way of addresses in second memory locations 302 and 303, of still other memory units (not shown) whenever first memory location 301 is written. The first memory locations of the still other memory units are also readable and writable independently of first memory location, and likewise first memory location 301 is also readable and writable independently of first memory location 201.

Software processes 122 and 123 are represented in control unit 120 as receivers, which read out and process the data from first memory location 301.

It is furthermore shown that memory unit 200 transmits data D also to second memory unit 400 in third control unit 130 via network connection 140 and copies data D there into first memory location 401. Memory unit 400 is likewise designed to copy the content of first memory location 401 automatically into first memory locations, defined by way of addresses in second memory locations 402 and 403, of still other memory units (not shown) whenever first memory location 401 is written. The first memory locations of the still other memory units are also readable and writable independently of first memory location 401; and likewise first memory location 401 is also readable and writable independently of first memory location 201.

Software processes 132 and 133 are represented in control unit 130 as receivers, which read out and process the data from first memory location 401.

For example, the vehicle speed is ascertained as data by an ABS/ESP control unit (e.g., 110) via the wheel speed and is transmitted via a bus/network to the engine control unit (e.g., 120) or to the comfort control unit (e.g., 130). There it is then possible to implement functions that depend thereon (e.g., 132) such as e.g. door locking when exceeding a specific speed.

This specific embodiment reduces the communication in network 140, which may be implemented for example as a CAN bus or a Flexray bus, since data D need to be transmitted only once more between participating memory units 200, 300, 400, and the respectively receiving memory unit (here 300 and 400, respectively) performs the data distribution within the processing unit (here 120 and 130, respectively). At the same time the transmitter is relieved as it does not need to process all registration requests.

What is claimed is:

1. A memory unit, which has a plurality of memory locations for accommodating data, and which is designed to copy a content of a first memory location of the memory unit, when the first memory location of the memory unit is written by a transmitter that is provided, automatically into a first memory location of at least one second memory unit, the first memory location of the at least one second memory unit being able to be read and written independently of the first memory location of the memory unit, wherein the first memory location of the memory unit copies the content of the first memory location of the memory unit to the first memory location of the at least one second memory unit over a first network connection that bypasses the transmitter, wherein the transmitter is configured to avoid receiving, storing, and transmitting all addresses pertaining to: i) the at least one receiver, and ii) a memory location of the plurality of memory locations of the second memory unit of the at least two memory units.

2. The memory unit as recited in claim 1, wherein an address of the first memory location of the at least one second memory unit is stored in a second memory location of the plurality of memory locations.

3. The memory unit as recited in claim 1, wherein the memory unit is part of an integrated circuit.

4. The memory unit as recited in claim 1, wherein the memory unit includes a second network connection that is exclusively associated with a first memory location of at least one third memory unit and through which the memory unit copies the content of the first memory location of the memory unit to the first memory location of the at least one third memory unit.

5. The memory unit as recited in claim 4, wherein the first network connection and the second network connection represent a combination that permits the memory unit to implement a multicast in hardware to the at least one second memory unit and the at least one third memory unit without executing a transmitter software process.

6. The memory unit as recited in claim 1, wherein the first memory location of the memory unit, the first memory location of the at least one second memory unit, and the first network connection are downstream of the transmitter.

7. A data network, comprising:
at least two memory units memory unit, each of which has a plurality of memory locations for accommodating data, and each of which is designed to copy the content of a first memory location of the respective memory unit, when the first memory location of the respective memory unit is written, automatically into a first memory location of at least one second memory unit, the first memory location of the at least one second memory unit being able to be read and written independently of the first memory location of the respective memory unit;
a transmitter and at least one receiver, wherein the transmitter is designed to write a datum to be sent into the first memory location of a first of the at least two memory units, and wherein the at least one receiver is designed to read and process the datum from the first memory location of a second memory unit of the at least two memory units, wherein the first memory location of the memory unit copies the content of the first memory location of the memory unit to the first memory location of the at least one second memory unit over a first network connection that bypasses the transmitter, wherein the transmitter is configured to avoid receiving, storing, and transmitting all addresses pertaining to: i) the at least one receiver, and ii) a memory location of the plurality of memory locations of the second memory unit of the at least two memory units.

8. The data network as recited in claim 7, wherein the second memory unit of the at least two memory units is designed to register with the first memory unit of the at least two memory units for receiving the data.

9. The data network as recited in claim 7, wherein the transmitter and the first memory unit are part of a first processing unit, and wherein the second memory unit and at least one receiver are part of a second processing unit.

10. The data network as recited in claim 7, which is developed as a multicore or many-core system.

11. The data network as recited in claim 7, which is developed as a control unit, wherein the transmitter and the receiver are software processes in the control unit.

12. The data network as recited in claim 7, further comprising multiple control units, wherein the transmitter and the receiver are software processes in different of the multiple control units.

13. The data network as recited in claim 7, wherein the data network is part of a motor vehicle data network.

14. The data network as recited in claim 7, further comprising a second network connection that is exclusively associated with a first memory location of at least one third memory unit and through which the respective memory unit copies the content of the first memory location of the respective memory unit to the first memory location of the at least one third memory unit.

15. The data network as recited in claim 14, wherein the first network connection and the second network connection represent a combination that permits the respective memory unit to implement a multicast in hardware to the at least one second memory unit and the at least one third memory unit without executing a transmitter software process.

16. The data network as recited in claim 7, wherein the first memory location of the memory unit, the first memory location of the at least one second memory unit, and the first network connection are downstream of the transmitter.

* * * * *